United States Patent [19]

Naruse et al.

[11] Patent Number: 4,756,238

[45] Date of Patent: Jul. 12, 1988

[54] APPARATUS FOR PERFORMING PLURAL OPERATIONS ON A COMMON WORKPIECE

[75] Inventors: Kazuo Naruse, Okazaki; Hideaki Tobita; Tetuo Kawakami, both of Toyota, all of Japan

[73] Assignees: Kyoho Machine Works, Ltd.; Toyota Jidosha Kabushiki Kaisha, both of Aichi, Japan

[21] Appl. No.: 941,064

[22] Filed: Dec. 12, 1986

[51] Int. Cl.⁴ .................... F01B 7/10; B23K 11/00
[52] U.S. Cl. ........................................ 92/65; 92/150; 92/151; 219/78.15
[58] Field of Search .............. 92/65, 150, 151; 60/415; 219/78.15, 78.16, 91.2, 93, 78.01, 86.7

[56] References Cited

U.S. PATENT DOCUMENTS

| | | | |
|---|---|---|---|
| 3,631,760 | 1/1972 | Moran | 92/65 |
| 4,609,805 | 9/1986 | Tobita et al. | 219/93 |

FOREIGN PATENT DOCUMENTS

| | | | |
|---|---|---|---|
| 1601717 | 3/1970 | Fed. Rep. of Germany | 92/65 |
| 1919095 | 10/1973 | Fed. Rep. of Germany | 92/65 |
| 2818337 | 10/1979 | Fed. Rep. of Germany | 92/65 |
| 2222059 | 5/1982 | Fed. Rep. of Germany | 279/2 A |
| 5207/84 | 3/1980 | Japan . | |
| 0019986 | 2/1981 | Japan | 219/78.15 |
| 359979 | 3/1962 | Switzerland | 92/65 |
| 606819 | 11/1978 | Switzerland | 92/151 |
| 644972 | 1/1979 | U.S.S.R. | 92/65 |

*Primary Examiner*—Robert E. Garrett
*Assistant Examiner*—Thomas Denion
*Attorney, Agent, or Firm*—Finnegan, Henderson, Farabow, Garrett and Dunner

[57] ABSTRACT

An actuator including a first cylinder chamber and a second cylinder chamber defined as separate entities in a cylinder for receiving a first piston and a second piston therein respectively. One of the first and second cylinder chambers is connected to an oil pressure source and the other cylinder chamber is connected to an air pressure source. A piston rod of the first piston and a piston rod of the second piston which move in relative sliding movement have at their forward ends separate operating portions for performing operations on a common workpiece.

7 Claims, 4 Drawing Sheets

APPARATUS FOR PERFORMING PLURAL OPERATIONS ON A COMMON WORKPIECE

BACKGROUND OF THE INVENTION

1. Field of the Invention

This invention relates to an actuator having two pistons located in one cylinder and driven by separate drive sources.

More particularly, the invention relates to an actuator having a first piston and a second piston inserted in one cylinder, the second piston including a piston rod located for relative sliding movement along a piston rod of the first piston. The cylinder having a first cylinder chamber for the first piston and a second cylinder chamber for the second piston formed separately and divided by a partition wall, one of the first and second cylinder chambers being connected to an oil pressure source and the other cylinder chamber being connected to an air pressure source while the first and second pistons have at their forward ends separate operating portions for performing operations on a common workpiece.

2. Description of the Prior Art

As is well known, actuators are widely in use in various kinds of industrial machinery for conveying workpieces, for transmitting forces and for other purposes. Emphasis is placed on the magnitude of the force for transmission, operability or responsiveness to serve the purpose of their use, and different drive systems, such as a hydraulic drive system relying on oil pressure or water pressure, a pneumatic drive system relying on air pressure or an electric drive system, are employed depending on the use to which they are put.

With an advance in the progress of factory automation achieved in recent years, there has been a strong demand for a reduction in production steps and an increase in the speed of production. Measures are being taken to perform more than two types of operations by using one type of industrial machine or to increase the speed at which a tool, for example, is moved to a location which is close to the workpiece.

Proposals have been made to meet the aforesaid demand in various ways. One apparatus developed to satisfy the demand comprises a machine tool having actuator-operated arms connected to a device for making holes and a welder respectively for performing various process steps successively. Another apparatus intended to satisfy the demand is equipped with an actuator of the two-stage operation system, as disclosed in Japanese Utility Model Examined Publication No. 5207/84, which includes a cylinder chamber having a first piston inserted therein and a second cylinder chamber formed in a piston rod of the first piston for receiving a second piston. The two cylinder chambers are selectively connectable to each other to keep them in and out of communication with each other to enable a drive fluid for the first piston to be used for driving the second piston, so as to control the speed at which a tool attached to a forward end of a piston rod of the second piston is moved to a location close to a workpiece.

Some disadvantages are associated with the apparatus of the prior art referred to hereinabove which employ actuators of the conventional type. Separate actuators should be used for different process steps, making the apparatus cumbersome and large in size. Moreover, the apparatus are low in operation efficiency because various process steps have to be followed successively.

The problem encountered in the case of the actuator of the two-stage operation system is that, since the first and second pistons share the same source of drive pressure, it is impossible to effect control of the pressure applied to each piston by altering the magnitude of the force.

Moreover, a backup force would be produced between first and second process steps depending on the use to which the apparatus is put. To cope with this situation, it would become necessary to provide a stop pin and a control mechanism. This increases costs and makes maintenance troublesome to carry out.

SUMMARY OF THE INVENTION

This invention has been developed for the purpose of obviating the problems encountered by the actuators of the prior art. Accordingly, the invention has as its object the provision of an actuator which is capable of separately controlling the speeds at which the two pistons fitted in a cylinder move in sliding movement and the pressures applied to the pistons, so that the actuator can serve as an excellent drive mechanism for use in various fields of industry.

The aforesaid object is accomplished according to the invention by forming, in a cylinder of the actuator, a first cylinder chamber and a second cylinder chamber as separate entities which are partitioned by a partition wall, the second cylinder chamber having fitted therein a second piston having a piston rod which extends through the partition wall and is inserted in a piston rod of a first piston fitted in the first cylinder chamber, so that the piston rods of the first and second pistons move in relative sliding movement. One of the first and second cylinder chambers is connected to an oil pressure source and the other cylinder chamber is connected to an air pressure source, to enable the sliding speeds of the two pistons to be controlled separately to apply a high pressure to one piston and a low pressure to the other piston. The first and second pistons are formed at their forward ends with separate operating portions for a common workpiece which can move independently of each other at different speeds toward the workpiece to apply pressures of different magnitudes to the workpiece.

According to the invention, the actuator of the two-stage operation system is simple in construction and capable of controlling the speeds of sliding movements of the pistons independently of each other while being able to separately control the magnitudes of pressures applied to the two pistons.

According to the invention, the first cylinder chamber and the second cylinder chamber are formed and located inside the cylinder of the actuator, and the piston rod of the second piston fitted in the second cylinder chamber is inserted in the piston rod of the first piston fitted in the first piston chamber for relative sliding movement. One of the first and second cylinder chambers is connected to an oil pressure source and the other cylinder chamber is connected to an air pressure source, so that it is possible to separately control the speeds of sliding movements of the two pistons and at the same time to apply a high pressure and a low pressure to the two pistons respectively.

The piston rods of the two pistons are formed at their forward ends with separate operating portions for a common workpiece. By virtue of this feature, the actuator is able, in spite of its construction being simple, to simultaneously follow two separate series of process steps. This is conductive to a shortening of the operation time and a reduction in installation costs.

The speeds at which the operating portions of the two pistons approach the common workpiece can be set at different levels independently of each other, and at the same time the pressures applied to the common workpiece by the two operating portions can also be set at different levels independently of each other.

DESCRIPTION OF THE PREFERRED EMBODIMENT

Figure 1:
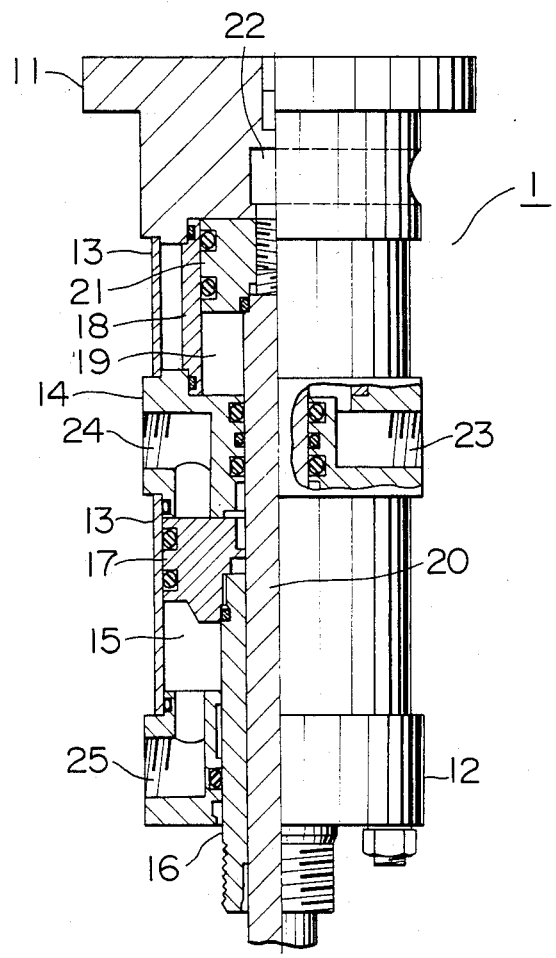
FIG. 1 is a fragmentary sectional view of the actuator comprising one embodiment of the invention.

A preferred embodiment of the actuator in conformity with the invention will now be described by referring to the drawings.

Figure 2:
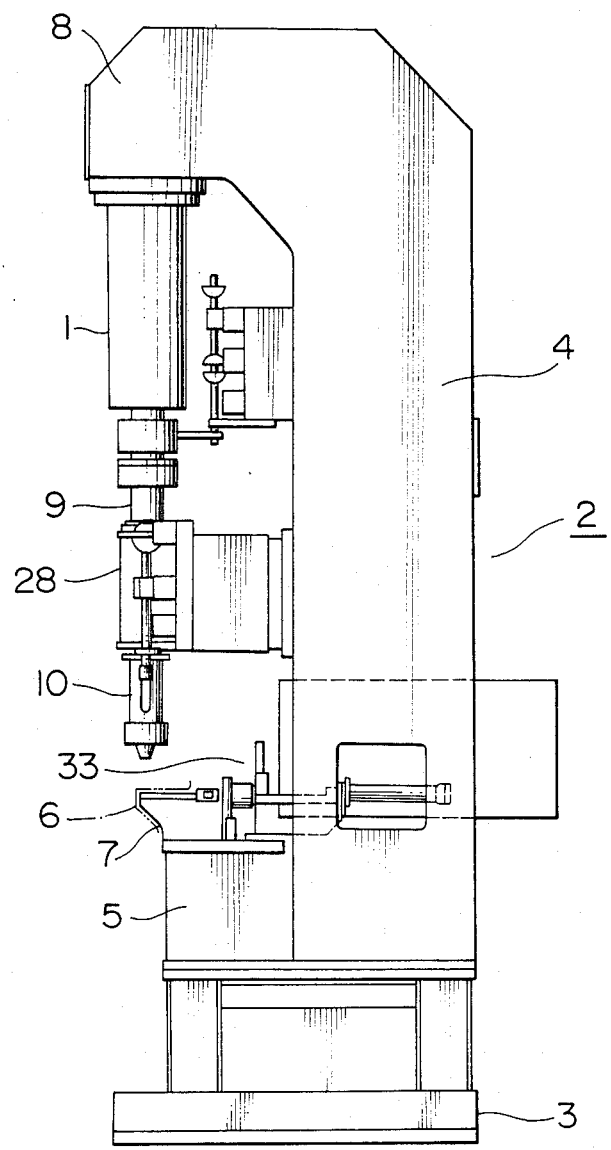
FIG. 2 is an external view of the whole of the working apparatus in which the actuator shown in FIG. 1 is incorporated.

Referring to FIG. 1, an actuator generally designated by the reference numeral 1 is adapted to be used in a working apparatus 2 shown in FIG. 2 which is capable of continuously following two series of process steps including welding process steps for welding a nut to a workpiece in plate form and punching process steps for making a hole for threadably fitting a bolt in the nut.

Referring to FIG. 2, the working apparatus 2 comprises a base 3, a C-shaped frame 4 on the base 3 including a lower frame 5 and a support die 7 on the lower frame 5 for supporting a workpiece 6. The C-shaped frame 4 further includes an upper frame 8 supporting the actuator 1 which depends from the upper frame 8 to a location near the support die 7. The actuator 1 has a working section 10 connected thereto through a rod connection 9.

Referring to FIG. 1 again, the actuator 1 comprises an upper flange 11 and a lower flange 12 connected together through a cylinder 13. An intermediate flange 14 is located in a set position in a central portion of the cylinder 13, and the intermediate flange 14 and the lower flange 12 define therebetween a first cylinder chamber 15.

A first piston 17 connected to a first piston rod 16 is fitted in the first cylinder chamber 15, and the first piston rod 16 penetrates the lower flange 12 and moves in sliding movement.

Mounted inside the cylinder 13 at a location between the upper flange 11 and intermediate flange 14 is an auxiliary cylinder 18 which defines a second cylinder chamber 19 which has fitted therein a second piston 21 connected to a second piston rod 20. The second piston rod 20 penetrates the intermediate flange 14 and moves in sliding movement, and is inserted in the first piston rod 16 for relative sliding movement.

The upper flange 11 is formed therein with an oil passageway 22 which is connected at one end to a portion of the second cylinder chamber 19 above the second piston 21 and at an opposite end to an oil pressure source, not shown. The intermediate flange 14 is formed therein with another oil passageway 23 which is connected at one end to a portion of the second cylinder chamber 19 below the second piston 21 and at an opposite end to the oil pressure source referred to hereinabove.

The intermediate flange 14 is formed therein with an air passageway 24 in a phase different from that of the oil passageway 23. The air passageway 24 is connected at one end to a portion of the first cylinder chamber 15 above the first piston 17 and at an opposite end to an air pressure source, not shown. The lower flange 12 is formed therein with another air passageway 25 which is connected at one end to a portion of the first cylinder chamber 15 below the first piston 17 and at an opposite end to the air pressure source referred to hereinabove.

As shown in FIG. 1, O-rings for sealing oil and air serving as fluids for driving the first and second pistons 17 and 21 are mounted at predetermined locations, although they are not designated by reference numerals.

Figure 3:
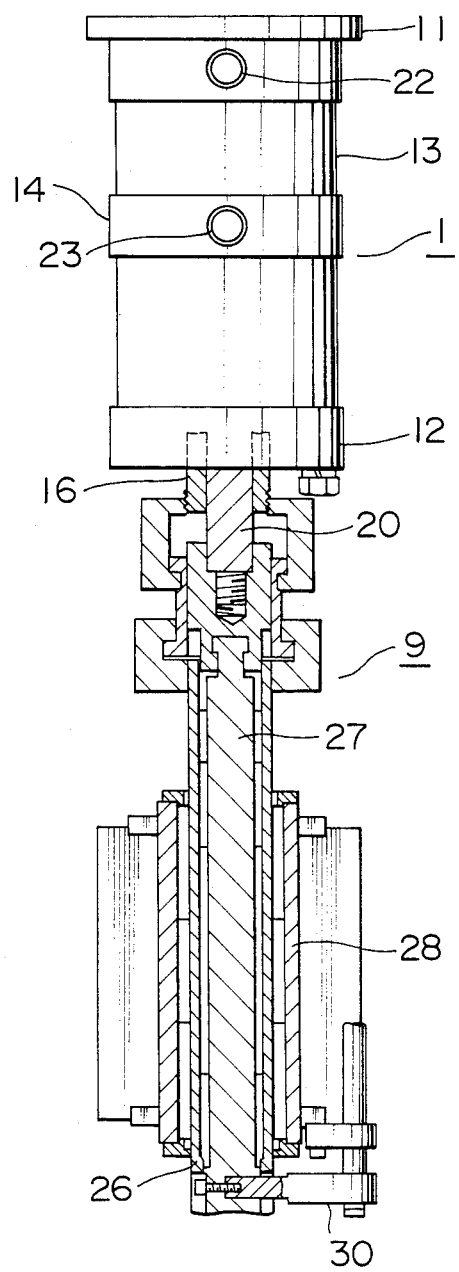
FIG. 3 is a fragmentary sectional view of the rod connection of the working apparatus shown in FIG. 2.

As shown in FIG. 3, the rod connection 9 includes a first connecting rod 26 connected to a forward end of the first piston rod 16, and a second connecting rod 27 connected to a forward end of the second piston rod 20 and fitted inside the first connecting rod 26 for elevatory movement therein. The first connecting rod 26 is supported for elevatory movement by a guide 28 supported by the frame 4 as shown in FIG. 2.

Figure 4:
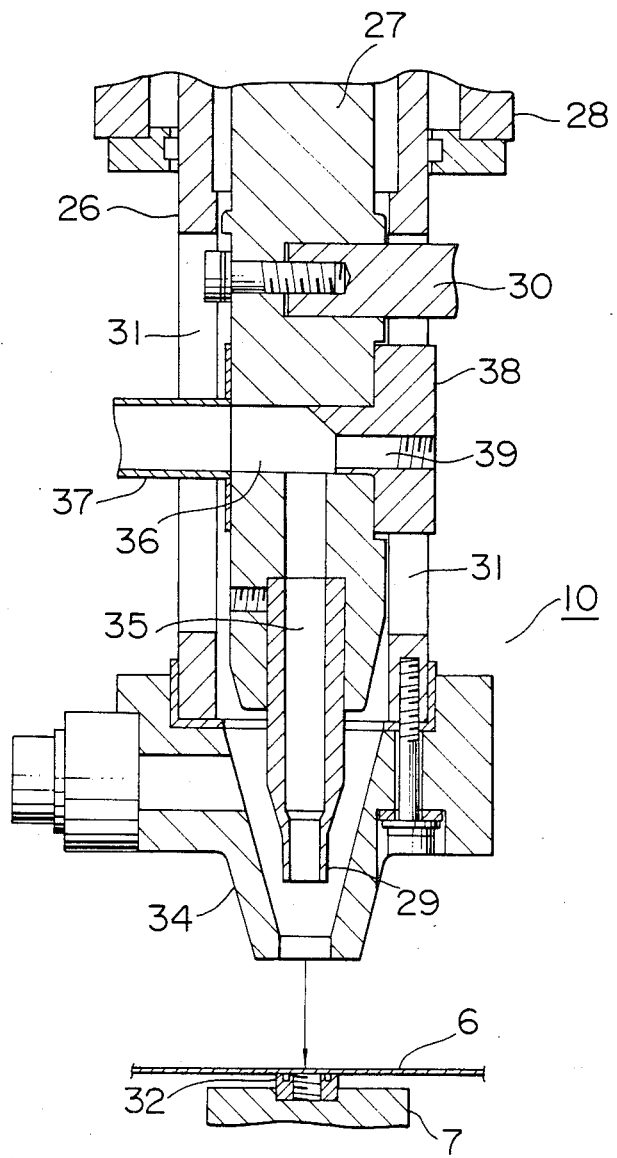
FIG. 4 is a sectional view of the working section of the working apparatus shown in FIG. 2.

In the working section 10, an electrode 34 for welding formed of steel and having an annular end face of a predetermined diameter as shown in FIG. 4 is secured to a forward end of the first connecting rod 26 to serve as an operating portion, and a punch 29 for making holes by means of a press having a predetermined diameter is secured to a forward end of the second connecting rod 27 to serve as an operating portion which can loosely extend through the electrode 34 which also serves as an operation portion as described hereinabove.

A stopper pin 30 projecting radially inwardly from the second connecting rod 27 at a predetermined location is inserted in a guide opening 31 of a predetermined length formed at a forward end portion of the first connecting rod 26 for elevatory movement therein and abutting engagement with opposite ends of the guide opening 31.

In the working apparatus 2, the pistons 17 and 21 of the actuator 1 are positioned at the top dead center at initial stages of operation, and the stopper pin 30 is located in a neutral position in the guide opening 31. The electrode 34 is located in a position in which its forward end is spaced apart from the workpiece 6 by a distance of 60 mm, so as to provide a space for setting and resetting the workpiece 6 on the support die 7. The first piston 17 and second piston 21 have strokes which are set at 65 mm and 80 mm, respectively, for example.

Referring to FIG. 4, the reference numeral 32 designates a nut which is to be joined to the workpiece 6 by projection welding in a predetermined position. The nut 32 is fed by an automatic nut feeding device 33 attached to the frame 4 as shown in FIG. 2 to a predetermined position above the support die 7 and placed thereon.

Referring to FIG. 4 again, the punch 29 is formed therein with an axial bore 35 for conveying a scrap therethrough after a hole is made in the workpiece 6 to discharge same to outside. The axial bore 35 has an inner diameter which is sufficiently large to prevent the scrap from falling by its own gravity in the bore 35. The bore 35 is connected, through a T-shaped discharge passageway 36 formed in the second connecting rod 27, to a discharge pipe 37 connected to one end of a horizontal portion of the T of the discharge passageway 36. A cap 38 is fitted to an opposite end of the horizontal portion of the T and formed with an air passageway 39 communicated with the axial bore 35 at one end and connected to an air pressure source, not shown, at an opposite end.

In the embodiment of the aforesaid construction, the nut 32 is automatically fed by the nut feeding device 33 to the predetermined position above the support die 7 and placed thereon. At the same time, the workpiece 6 is placed on the predetermined position on the die 7.

Then, an oil pressure source, not shown, is connected to the oil passageway 22 formed in the upper flange 11 of the actuator 1 to introduce a working oil of a predetermined pressure into the second cylinder chamber 19 to move the second piston 21 downwardly. At the same time, an air pressure source, not shown, is connected to the air passageway 24 formed in the intermediate flange 14 to introduce a working air of a predetermined pressure into the first cylinder chamber 15 to move the first piston 17 downwardly.

The working oil and working air are separately metered, and the speeds of downward movements of the first piston 17 and second piston 21 are controlled such that the speed of downward movement of the former is higher than that of the latter. The speeds of downward movements of the two pistons 17 and 21 are constant.

Figure 5:
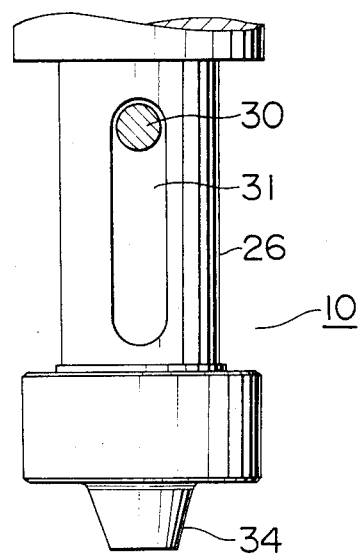
FIG. 5 is a side view of the working section shown in FIG. 4.

Thus the electrode 34 for performing welding which is connected to the first piston 17 via the first piston rod 16 and first connecting rod 26 moves downwardly at a predetermined speed, and the punch 29 connected to the second piston 21 via the second piston rod 20 and second connecting rod 27 moves downwardly at a predetermined speed. Since the speed of downward movement of the first piston 17 is set at a higher level than that of the second piston 21 as described hereinabove, the stopper pin 30 is brought into abutting engagement with the upper end of the guide opening 31 formed in the first connecting rod 26, as shown in FIGS. 4 and 5, during the downward movement of the first connecting rod 26, with a result that the second connecting rod 27 moves downwardly together with the first connecting rod 26.

The electrode 34 is brought into contact with the workpiece 6 and joins the nut 32 by projection welding to the workpiece 6 under a predetermined welding condition while being urged by the predetermined air pressure to press against the workpiece 6. After the electrode 34 is brought into contact with the workpiece 6, the second piston 21 is moved further downwardly by, say, about 5 mm by the oil pressure before coming to a halt.

While the projection welding is being performed, the predetermined air pressure is continuously applied to the electrode 34 through the first piston 17. This eliminates the need to provide, as in the case with the prior art, a mechanism, such as a backup look mechanism, for avoiding the production of a reaction which would otherwise be produced when the electrode 34 is brought into contact with the workpiece 6. The electrode 34 moves downwardly by, say, about 1.5 mm as the nut 32 is welded by projection welding to the workpiece 6.

Following the welding operation, the working oil is introduced under the predetermined pressure described hereinabove into an upper portion of the second cylinder chamber 19 through the oil passageway 22, to move the second piston 21 further downwardly to make a hole in the workpiece 6 by means of the punch 29.

Following the welding and punching operations described hereinabove, a directional control valve, not shown, is actuated to connect the oil passageway 23 in the intermediate flange 14 to the oil pressure source and disconnecting the oil passageway 22 in the upper flange 11 from the oil pressure source, to move the second piston 21 upwardly to bring the punch 29 out of contact with the workpiece 6. Meanwhile the air passageway 25 in the lower flange 12 is connected to the air pressure source and the air passageway 24 in the intermediate flange 14 is disconnected from the air pressure source, to move the first piston 17 upwardly and bring the electrode 34 out of contact with the workpiece 6, thereby finishing one cycle of operation.

In the embodiment shown and described hereinabove, the punch 29 of the working apparatus 1 changes, during its downward movement, the speed of its downward movement and moves downwardly at the same speed as the electrode 34 until the electrode 34 is bought into contact with the workpiece 6. This reduces the time necessary for the punch 29 to reach the workpiece 6, and the punch 29 is positioned at a location close to the workpiece 6 when the nut 32 is welded to the workpiece 6, making it possible to perform punching as soon as welding is performed. This is conducive to a reduction in the period of time required for performing one cycle of the welding and punching operations.

Scraps of the workpiece 6 produced when holes are successively made by means of the punch 29 enter the axial bore 35 one by one and forced to move upwardly. Upon reaching the horizontal portion of the T-shaped discharge passageway 36, they are blown by a current of compressed air supplied through the air passageway 39 and ejected through the discharge pipe 37 to outside from the working apparatus 2.

While a preferred embodiment of the invention has been shown and described hereinabove, it is to be understood that the invention is not limited to this specific form of the embodiment, and that many changes and modifications may be made therein. For example, the first cylinder chamber may be connected to an oil pressure source and the second cylinder chamber may be connected to an air pressure source, depending on the use to which the actuator is put. The operating portions at the forward ends of the piston rods are not limited to the electrode for performing welding and the punch for making holes, and the actuator according to the invention can have application in any apparatus as desired which have operating portions serving the purpose and suiting the condition of various types of operations performed by the apparatus.

What is claimed is:

1. An apparatus for performing a plurality of operation on a common workpiece, comprising:
    a cylinder having an intermediate wall disposed between opposite ends thereof defining a first chamber and a second chamber axially disposed from the first chamber;
    a first piston and rod assembly mounted in said first chamber, said first rod assembly being tubular and extending through one of said opposite ends of the cylinder;
    a second piston and rod assembly mounted in said second chamber, said second rod assembly extending through said intermediate wall, said first piston and rod assembly and said one end of the cylinder, said second piston and rod assembly being slidable relative the first piston and rod assembly;

a first tool connected to said first rod assembly for performing a first processing operation on a workpiece at times when said first piston and rod assembly carries said first tool from a normal position to a first predetermined extended position from said one end of the cylinder adjacent the workpiece;

a second tool connected to said second rod assembly for performing a second processing operation on the workpiece at times when said second piston and rod assembly carries said second tool from said normal position to a second predetermined extended position relative said first tool in said first predetermined position;

first means for introducing a first fluid under pressure into said first chamber for moving said first piston and rod assembly at a first rate of speed for carrying said first tool to said first predetermined position;

second means for introducing a second fluid under pressure into said second chamber for moving said second piston and rod assembly at a second rate of speed slower than said first rate of speed for carrying said second tool to said second predetermined position; and cooperating means mounted on said first and second piston and rod assemblies operative to move said second piston and rod assembly at said first rate of speed to a third predetermined position intermediate said normal position and said second predetermined position, and from said intermediate position to said second predetermined position at said second rate of speed, upon introduction of said first and second fluids under pressure.

2. An apparatus for performing a plurality of operations on a common workpiece according to claim 1, wherein:
the first means for introducing fluid under pressure includes passageway means for the introduction of air, and the second means for introducing fluid under pressure includes passageway means for the introduction of a liquid.

3. An apparatus for performing a plurality of operations on a common workpiece according to claim 1, wherein:
the cooperating means, comprising:
an elongated axially extending slot of a predetermined length formed in the first piston rod assembly; and
a stopper pin attached to the second piston rod assembly slidably disposed in said slot, said stopper pin being in physical engagement with one end of said slot adjacent another opposite end of the cylinder during movement of the second piston and rod assembly at the first rate of speed, and said stopper pin moving along the length of said slot out of engagement with said one end of the slot toward the one end of the cylinder at the second rate of speed.

4. An apparatus for performing a plurality of operations on a common workpiece according to claim 1, wherein:
the first tool is comprised of a welding electrode, having a welding surface, for welding a first workpiece having an opening therethrough, to a second workpiece; and
the second tool is a punch for forming a hole in said second workpiece in alignment with the opening in said first workpiece.

5. An apparatus for performing a plurality of operations on a common workpiece according to claim 4, wherein:
the punch is disposed in the welding electrode a first distance from the welding surface at times when the second tool is in the normal position, and disposed a second distance closer to said welding surface than the first distance at times when the second tool is in the third position.

6. An apparauts for performing a plurality of operations on a common workpiece according to claim 5, wherein:
the punch has a central bore with an axially extending portion and a radially extending portion, said central bore being operative to receive blanks punched from second workpieces; and
the first piston rod assembly further includes means for applying air under pressure to one end of said radial portion for blowing received blanks out of said radial portion.

7. A method of welding together a pair of workpieces, including a nut and a metallic plate, with an apparatus having a punch concentrically mounted in a welding electrode, the welding electrode being driven from a first normal position spaced from the workpieces to a working position in contact with one of the workpieces by application of air under pressure to a first piston assembly, and the punch being driven from a second normal position spaced from the workpieces to the working position independently of the welding electrode by liquid under pressure applied to a second piston assembly, the method comprising:
applying air under pressure to said first piston assembly for driving said welding electrode from the normal position to the working position at a first rate of speed;
applying liquid under pressure to said second piston assembly effective to drive said punch from the second normal position to the working position at a second rate of speed slower than said first rate of speed,
engaging said first and second piston assemblies to drive said punch to an intermediate position between said first and second normal positions and said working position at said first rate of speed; and
disengaging said first and second piston assemblies for driving said punch from said intermediate position to said working position at said second rate of speed.

* * * * *